United States Patent
Sheets, Jr. et al.

(10) Patent No.: US 10,443,979 B2
(45) Date of Patent: Oct. 15, 2019

(54) TURRET ASSEMBLY

(71) Applicant: Sig Sauer, Inc., Newington, NH (US)

(72) Inventors: Robert E. Sheets, Jr., Portland, OR (US); Andrew W. York, Portland, OR (US)

(73) Assignee: Sig Sauer, Inc., Newington, NH (US)

( * ) Notice: Subject to any disclaimer, the term of this patent is extended or adjusted under 35 U.S.C. 154(b) by 285 days.

(21) Appl. No.: 15/398,854

(22) Filed: Jan. 5, 2017

(65) Prior Publication Data
US 2017/0205195 A1    Jul. 20, 2017

Related U.S. Application Data

(60) Provisional application No. 62/279,097, filed on Jan. 15, 2016.

(51) Int. Cl.
*F41G 1/38* (2006.01)
*F41G 3/08* (2006.01)
*G02B 27/36* (2006.01)

(52) U.S. Cl.
CPC .............. *F41G 1/38* (2013.01); *F41G 3/08* (2013.01); *G02B 27/36* (2013.01)

(58) Field of Classification Search
CPC .............. G02B 27/36; F41G 3/08; F41G 1/38
USPC .......................................................... 42/125
See application file for complete search history.

(56) References Cited

U.S. PATENT DOCUMENTS

| | | | | |
|---|---|---|---|---|
| 4,038,757 A * | 8/1977 | Hicks | .................... | B25B 15/00 356/252 |
| 5,513,440 A * | 5/1996 | Murg | ........................ | F41G 1/26 33/298 |
| 6,643,970 B2 * | 11/2003 | Huber | ....................... | F41G 1/38 42/119 |
| 6,691,447 B1 * | 2/2004 | Otteman | ................... | F41G 1/38 359/429 |
| 7,640,830 B2 * | 1/2010 | Bonis | ........................ | F41G 1/38 42/119 |

(Continued)

OTHER PUBLICATIONS

Schmidt & Bender Main Catalog 2016, ID: 971-222-015 | © Schmidt & Bender GmbH & Co. KG, 52 pages.

(Continued)

*Primary Examiner* — Joshua E Freeman
*Assistant Examiner* — Bridget A Cochran
(74) *Attorney, Agent, or Firm* — Finch & Maloney PLLC

(57) ABSTRACT

A turret assembly configured to be coupleable to the combination of a rifle scope and a rifle, to adjust the rifle scope relative to the rifle is provided. The turret assembly includes a turret body, a jacking screw, and a turret cap. The turret assembly may also include a locking mechanism including a locking pin configured to prevent rotational movement of the turret cap relative to the turret body. The turret assembly may include a stopping mechanism configured to limit rotational movement of the turret cap relative to the turret body. The stopping mechanism may include a zero stop ring which defines a zero stop point which prevents further rotational movement of the turret cap. The turret assembly may also include an indicator configured to depict information about the position of the turret cap relative to the turret body, where the indicator is configured for only translational movement.

12 Claims, 17 Drawing Sheets

(56) References Cited

U.S. PATENT DOCUMENTS

| | | | | |
|---|---|---|---|---|
| 8,006,429 B2* | 8/2011 | Windauer | | F41G 1/38 42/119 |
| 8,166,696 B2* | 5/2012 | Hamilton | | F41G 1/38 359/429 |
| 9,170,068 B2* | 10/2015 | Crispin | | F41G 1/16 |
| 9,188,408 B2* | 11/2015 | Huynh | | F41G 1/22 |
| 9,970,735 B2* | 5/2018 | Walker | | F41G 1/38 |
| 9,989,362 B2* | 6/2018 | Ottl | | F41G 1/38 |
| 10,145,651 B2* | 12/2018 | Cheng | | G05G 5/00 |
| 2003/0145505 A1* | 8/2003 | Kenton | | F41G 1/38 42/135 |
| 2004/0144013 A1* | 7/2004 | Leatherwood | | F41G 1/545 42/126 |
| 2008/0007843 A1* | 1/2008 | Schafer | | F41G 1/18 359/702 |
| 2008/0186584 A1* | 8/2008 | Ballard | | F41G 1/383 359/611 |
| 2010/0175298 A1* | 7/2010 | Thomas | | F41G 1/18 42/122 |
| 2010/0229451 A1* | 9/2010 | Hamilton | | F41G 1/345 42/126 |
| 2011/0102918 A1* | 5/2011 | Windauer | | F41G 1/18 359/821 |
| 2011/0261449 A1* | 10/2011 | Schmitt | | F41G 1/38 359/428 |
| 2012/0147488 A1* | 6/2012 | Riley | | G02B 7/004 359/811 |
| 2012/0167444 A1* | 7/2012 | Adkins | | F41G 1/38 42/135 |
| 2013/0276345 A1* | 10/2013 | Hamilton | | F41G 1/38 42/119 |
| 2014/0137458 A1* | 5/2014 | Crispin | | F41G 1/38 42/119 |
| 2014/0196351 A1* | 7/2014 | Campean | | G05G 1/082 42/119 |
| 2015/0070758 A1* | 3/2015 | Ingenito | | G02B 7/023 359/399 |
| 2015/0146289 A1* | 5/2015 | Ingenito | | F41G 1/38 359/429 |
| 2015/0153138 A1* | 6/2015 | Presley | | F41G 1/38 42/122 |
| 2015/0268001 A1* | 9/2015 | Porter | | F41G 1/38 42/130 |
| 2016/0040959 A1* | 2/2016 | Davidson | | F41G 1/38 42/122 |
| 2017/0328674 A1* | 11/2017 | Vanbecelaere | | F41G 1/38 |
| 2018/0010887 A1* | 1/2018 | VanBecelaere | | G02B 7/004 |
| 2018/0252498 A1* | 9/2018 | Zimmermann | | F41G 1/38 |
| 2018/0328695 A1* | 11/2018 | Meinert | | F41G 1/387 |

OTHER PUBLICATIONS

Shawn Peters, Peters Leupold M1 Zero Stop, Published Feb. 4, 2014, https://www.youtube.com/watch?v=Gee0de9df14.

NightforceOpticsUSA, "Nightforce ZeroStop—Explanation and Correct Adjustment.mp4", https://www.youtube.com/watch?v=O4rqWoW3wR8, published Jun. 17, 2012.

Vortex Optics, Vortex Optices Instructional Video, How to Set the CRS Zero Stop (Viper PST / HSLR / HST/ XBR), https://www.youtube.com/watch?v=O93LjGzTfls, published Feb. 17, 2014.

Leupold & Stevens, Inc., "Leupold Tactical Optics, Tactical Riflescope User's Manual", Copyright 2011, 44 pages.

* cited by examiner

TURRET ASSEMBLY

CROSS-REFERENCE TO RELATED APPLICATION

This application claims the benefit of U.S. Provisional Application No. 62/279,097, filed Jan. 15, 2016, which is incorporated by reference herein.

FIELD OF THE INVENTION

This disclosure relates generally to a turret assembly for a rifle scope, and more specifically to a turret assembly with one or more of the following features: a locking mechanism, a stopping mechanism, and an indicator configured for translational movement.

BACKGROUND

A rifle scope is a telescopic sight coupled to a rifle to increase a shooter's ability to accurately hit an intended target. The rifle scope may help the shooter compensate for gravitational and aerodynamic forces.

A turret assembly may be mounted to the rifle scope to allow the shooter to adjust the position of the rifle scope relative to the rifle. One type of turret assembly, commonly known as an elevation turret, may be configured to allow a shooter to make appropriate adjustments for range (i.e. distance from rifle to intended target). Another type of turret assembly, commonly known as a windage turret, may be configured to allow a shooter to make appropriate adjustments for wind conditions.

SUMMARY

In one embodiment, a turret assembly configured to be coupleable to the combination of a rifle scope and a rifle, to adjust the rifle scope relative to the rifle is provided. The turret assembly includes a turret body, the turret body having a first end and a second end and the turret body defining a turret axis. The turret assembly also includes a jacking screw coupled to the first end of the turret body, the jacking screw configured for rotational movement relative to the turret body about the turret axis, where movement of the jacking screw is configured to adjust a rifle scope in relation to the rifle. The turret assembly further includes a turret cap coupled to the second end of the turret body and configured for both rotational movement relative to the turret body about the turret axis, and translational movement relative to the turret body along the turret axis, where movement of the turret cap initiates movement of the jacking screw. The turret assembly also includes a locking mechanism configured to prevent rotational movement of the turret cap relative to the turret body. The locking mechanism includes a locking pin within the turret body, the locking pin moveable between an unlocked position and a locked position, where in the locked position, at least a portion of the locking pin protrudes out of the second end of the turret body. The turret cap is moveable translationally along the turret axis between a first position and a second position, where when the turret cap is in the first position and the locking pin is in its locked position, the locking pin engages the turret cap to prevent rotational movement of the turret cap relative to the turret body, and when the turret cap is in the second position, the locking mechanism is disengaged from the turret cap so the turret cap is free to rotate relative to the turret body.

In another embodiment, a turret assembly configured to be coupleable to the combination of a rifle scope and a rifle, to adjust the rifle scope relative to the rifle is provided. The turret assembly includes a turret body, the turret body having a first end and a second end, the turret body defining a turret axis. The turret assembly also includes a jacking screw coupled to the first end of the turret body, the jacking screw configured for rotational movement relative to the turret body about the turret axis, where movement of the jacking screw is configured to adjust a rifle scope in relation to the rifle. The turret assembly further includes a turret cap coupled to the second end of the turret body, the turret cap configured for both rotational movement relative to the turret body about the turret axis, and translational movement relative to the turret body along the turret axis, where movement of the turret cap initiates movement of the jacking screw. The turret assembly also includes a stopping mechanism configured to limit rotational movement of the turret cap relative to the turret body in one direction. The stopping mechanism includes a zero stop ring positioned within the turret body, where the zero stop ring is configured for rotational movement relative to the turret body about the turret axis, where the position of the zero stop ring relative to the turret body defines a zero stop point which, once reached, prevents further rotational movement of the turret cap in one direction.

In yet another embodiment, a turret assembly configured to be coupleable to the combination of a rifle scope and a rifle, to adjust the position of the rifle scope relative to the rifle is provided. The turret assembly includes a turret body, the turret body having a first end and a second end, the turret body defining a turret axis. The turret assembly also includes a jacking screw coupled to the first end of the turret body, the jacking screw configured for rotational movement relative to the turret body about the turret axis, where movement of the jacking screw is configured to adjust a rifle scope in relation to the rifle. The turret assembly further includes a turret cap coupled to the second end of the turret body, the turret cap configured for rotational movement relative to the turret body about the turret axis, where movement of the turret cap initiates movement of the jacking screw. The turret assembly also includes an indicator coupled to the turret body, the indicator configured to depict information about the position of the turret cap relative to the turret body, where the indicator is configured for only translational movement relative to the turret body along the turret axis.

DETAILED DESCRIPTION

Accuracy and precision are of critical importance in a wide range of ballistics applications, examples of which include target shooting, hunting, self-defense, military, and law enforcement applications. Because the uncertainty associated with the unaided aiming of a firearm or other weapon is often significant, many improvements have been made to increase a shooter's ability to accurately hit an intended target. One such improvement is a telescopic sight, which is also sometimes referred to as a rifle scope. A rifle scope provides improved viewing of the target, for example using optical magnification, and therefore helps the shooter visualize where a projectile will travel. In addition to providing magnification, a rifle scope will also often include a reticle having stadia marks or other visual indicia that can be used to facilitate range-finding and to help the shooter adjust for the gravitational and aerodynamic (crosswind) forces that affect the trajectory of a projectile. For example, many reticles provide multiple aiming points for aiming at different distances or under different wind conditions.

Figure 1:
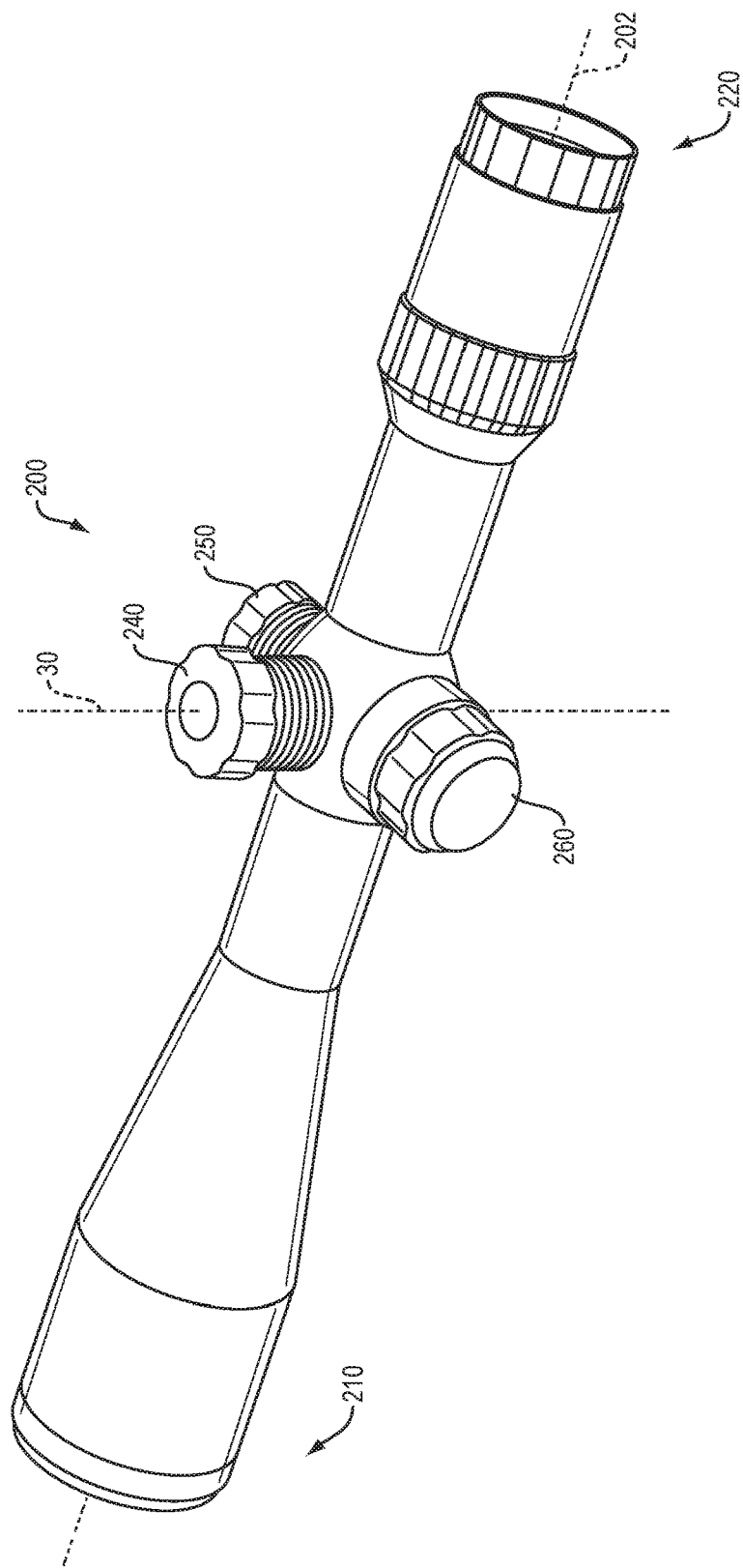
FIG. 1 is a perspective view of an exemplary rifle scope which features a plurality of turrets.

FIG. 1 is a perspective view of an exemplary rifle scope 200. The rifle scope 200 shown in FIG. 1 may be coupled to a rifle (not shown). The rifle scope 200 has a reticle positioned within rifle scope 200, along its optical axis 202, and therefore is not visible in the exterior perspective view illustrated in FIG. 1. An objective end 210 of rifle scope 200 is positioned toward the intended target, while an ocular end 220 is positioned adjacent to the shooter's eye. Rifle scope 200 includes three turrets 240, 250, 260. An elevation turret 240 can be used to adjust the vertical calibration of the reticle. As shown, the elevation turret 240 defines a turret axis 30 which is substantially perpendicular to the optical axis 202. A windage turret 250 can be used to adjust the horizontal calibration of the reticle and an auxiliary turret 260 can be used to provide other adjustments or manipulations to rifle scope 200. It should be appreciated that in other embodiments, a rifle scope 200 may include only one or two of the above-mentioned turrets 240, 250, 260, and furthermore, the turrets 240, 250, 260 may be positioned differently on the rifle scope body.

As set forth in greater detail below, one aspect of the present invention is directed to a turret assembly with a locking mechanism that locks the position of the turret assembly. The locking mechanism may be configured to prevent the shooter from inadvertently adjusting the position of the turret assembly. The position of the turret assembly may be initially set by the shooter. Once the shooter puts the locking mechanism in a locked position, the position of the turret assembly may not be adjusted until the shooter unlocks or disengages the locking mechanism.

Another aspect of the present invention outlined below is directed to a turret assembly with a stopping mechanism that is configured to prevent the shooter from adjusting the position of the turret assembly past a predetermined stop point. As discussed below, the shooter may initially set the predetermined stop point. The shooter may then be able to adjust the position of the turret assembly, but once the predetermined stop point is reached, the stopping mechanism may be configured to prevent further adjustments in that direction. As set forth in more detail below, the shooter may be able to "back up" and adjust in the opposite direction.

As discussed more below, yet another aspect of the present invention is directed to a turret assembly with an indicator that depicts information about the position of the turret assembly. The indicator can be configured for only translation movement relative to the turret body. In other words, this indicator does not need to rotate relative to the turret body.

One illustrative embodiment of the present invention includes a turret assembly which includes all of the above mentioned features: a locking mechanism, a stopping mechanism and an indicator configured for only translational movement. However, it should be appreciated that other embodiments of the present invention are directed to a turret assembly which includes only one of these features, as the invention is not so limited. For example, in one embodiment, the turret assembly only includes the locking mechanism, in another embodiment, the turret assembly only includes the stopping mechanism, and in another embodiment, the turret assembly only includes the translationally moving indicator, and various combinations thereof, as the invention is not so limited.

Figure 2:
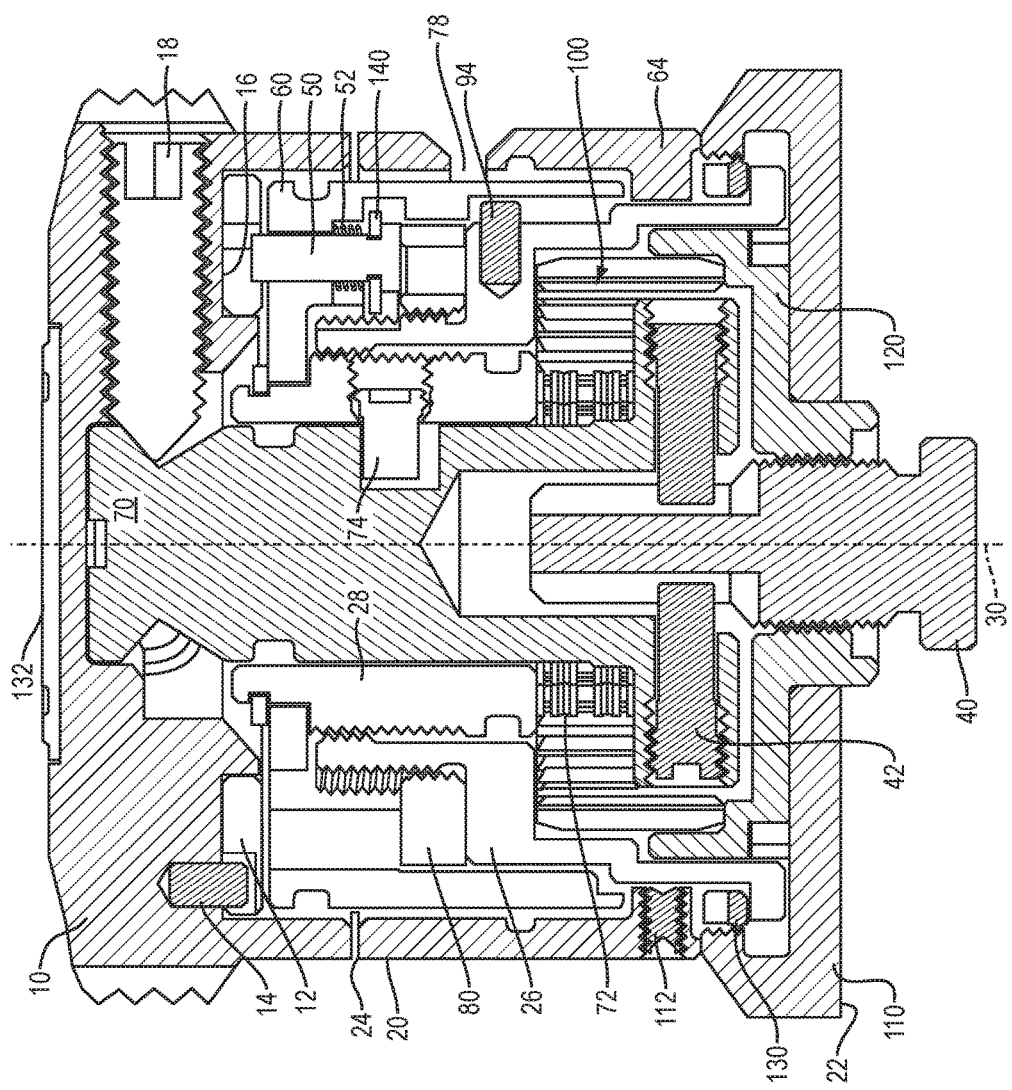
FIG. 2 is a cross-sectional view of a turret assembly according to one embodiment of the present invention.

Turning to FIGS. 2-5, one embodiment of a turret assembly is illustrated which includes a turret body 20 having a first end 22 and an opposing second end 24. The turret body 20 defines a turret axis 30 that passes through the turret body 20 from the first end 22 to the second end 24. As illustrated in FIGS. 1 and 2, in one embodiment, the turret axis 30 is substantially perpendicular to the optical axis 202 of the rifle scope 200.

The turret assembly further includes a jacking screw 40 coupled to the first end 22 of the turret body 20. The jacking screw 40 is configured for rotational movement relative to the turret body 20 about the turret axis 30 and movement of the jacking screw 40 is configured to adjust an adjacent rifle scope 200 (see FIG. 1). In particular, as illustrated in FIGS. 2-5, the jacking screw 40 may be threaded to the turret body 20 such that rotational movement of the jacking screw 40 in one direction (i.e. in the clockwise direction) moves the jacking screw 40 helically down the threads along the turret axis 30, and likewise, rotational movement of the jacking screw 40 in the opposite direction (i.e. in the counterclockwise direction) may move the jacking screw helically up the threads along the turret axis 30. The jacking screw 40 may be coupled to the adjacent rifle scope 200 (see FIG. 1) to adjust the position of the above described reticle.

As shown in FIGS. 2-7, the turret assembly further includes a turret cap 10 which is coupled to the second end 24 of the turret body 20. As discussed in greater detail below, the turret cap 10 may be configured for both rotational movement relative to the turret body 20 about the turret axis 30 and translational movement relative to the turret body 20 along the turret axis 30. Furthermore, as discussed in greater detail below, the turret cap 10 is configured such that movement of the turret cap 10 initiates movement of the jacking screw 40. Thus, a user may rotate the turret cap 10 to adjust the position of the rifle scope 200 reticle.

Figure 3:
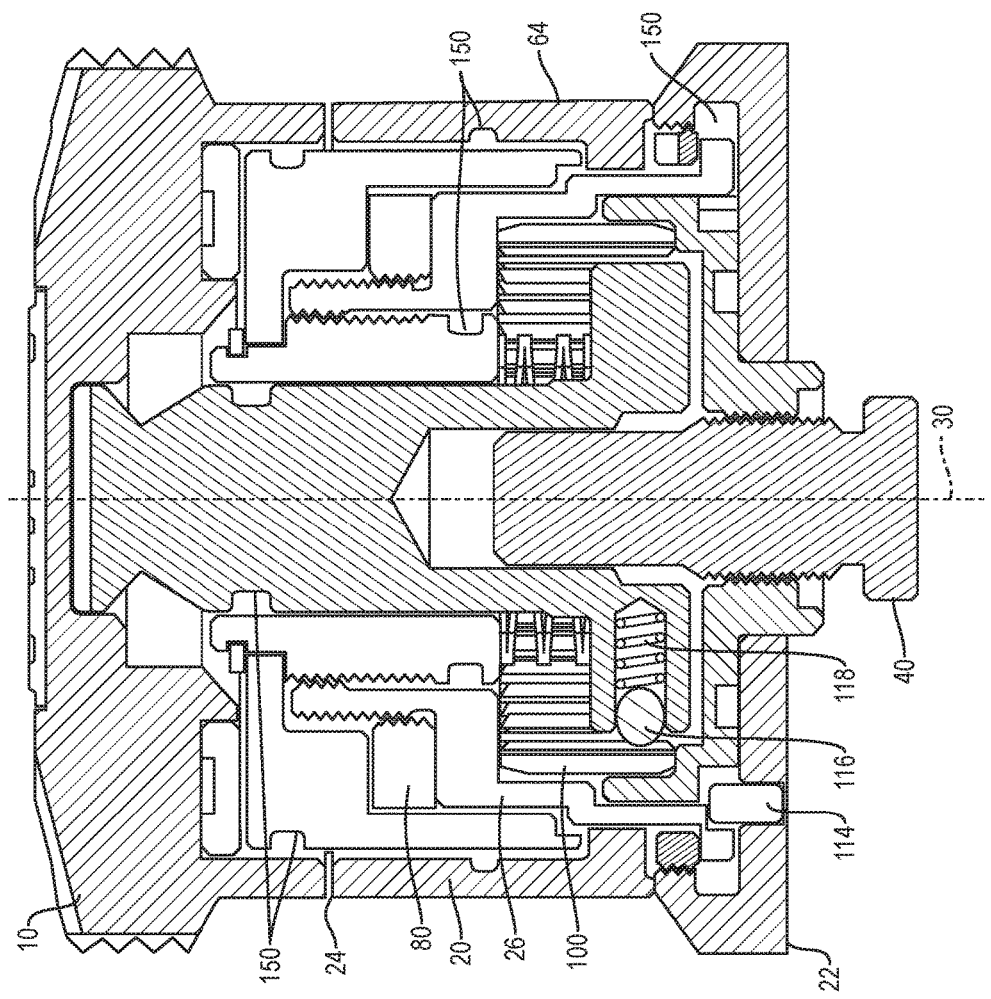
FIG. 3 is another cross-sectional view of a turret assembly according to one embodiment of the present invention.

In one illustrative embodiment shown in FIGS. 2 and 3, the turret assembly includes a click ring 100 which allows the user to rotate the turret cap one or more clicks. In one embodiment, the click ring 100 has 48-50 clicks per one full rotation. One of skill in the art will appreciate that in another embodiment, a click ring 100 with a different configuration may also be used, as the invention is not so limited. As set forth in greater detail below, one click rotation of the turret cap 10 may correspond to one click rotation of the jacking screw 40.

As mentioned above, aspects of the present invention are directed to a turret assembly which has a locking mechanism configured to prevent rotational movement of the turret cap relative to the turret body. Therefore, the position of the rifle scope 200 reticle can be locked. This locking mechanism may be desirable because once the rifle scope has been positioned, a user may not want to inadvertently make any adjustments. For example, in one embodiment, the distance between the shooter and the target is approximately 100 meters. Once the shooter has adjusted the elevation turret (and corresponding jacking screw 40) to correspond to this distance, it may be desirable to lock the turret cap 10. As set forth in greater detail below, in one illustrative embodiment, the turret assembly is configured such that once the rotational position of the turret cap is locked, the user may pull the turret cap 10 up along the turret axis 30 and away from the turret body 20 to disengage the locking mechanism so that the turret cap 10 is free to rotate relative to the turret body 20.

As mentioned above, further aspects of the present invention are directed to a turret assembly which has a stopping mechanism configured to limit rotational movement of the turret cap 10 relative to the turret body 20. The stopping mechanism may include a zero stop ring 80 configured for rotational movement relative to the turret body 20 about the turret axis 30. As set forth in greater detail below, the position of the zero stop ring 80 relative to the turret body 20 may define a zero stop point which, once reached, prevents further rotational movement of the turret cap 10. In other words, the stopping mechanism may be configured such that the turret cap 10 may be rotated, thus adjusting the relative angle of the rifle scope reticle, until the zero stop point is reached. At this point, the turret cap 10 may not be rotated any further in this direction, but may be rotated back in the opposite direction. The stopping mechanism may be desirable when the user wants to set a floor that prevents any further adjustment in a given direction. For example, in one embodiment, the distance between the shooter and the target is approximately 100 meters. The stopping mechanism may be used to prevent the turret cap 10 from being rotated past 100 meters, but it may be configured so that the user can still easily dial back to a shorter distance, less than 100 meters.

Additional aspects of the present invention are directed to a turret assembly with an indicator 60 coupled to the turret body 20 which is configured to depict information about the position of the turret cap 10 relative to the turret body 20. For example, in one illustrative embodiment, the indicator 60 is configured to visually show the user the number of times that the turret cap 10 has been rotated relative to the turret body 20. In one illustrative embodiment, the indicator 60 is configured for only translational movement relative to the turret body 20 along the turret axis 30. As set forth in greater detail below, this feature may make it easier for the shooter to identify small changes in the position of the turret cap 10 relative to the turret body 20.

The turret assembly locking mechanism will now be further described. As shown in one illustrative embodiment shown in FIGS. 2, 4 and 5, the locking mechanism includes a locking pin 50 positioned within the turret body 20. The locking pin 50 is moveable between an unlocked position (shown in FIG. 5) and a locked position (shown in FIGS. 2 and 4). As shown, in the locked position, at least a portion of the locking pin 50 protrudes upwardly and out of the second end 24 of the turret body 20. As shown in FIG. 2, a locking pin spring 52 may bias the locking pin 50 in the unlocked position. Furthermore, as illustrated in the figures, the locking pin 50 may be moveable translationally along a path that is substantially parallel to the turret axis 30.

Figure 4:
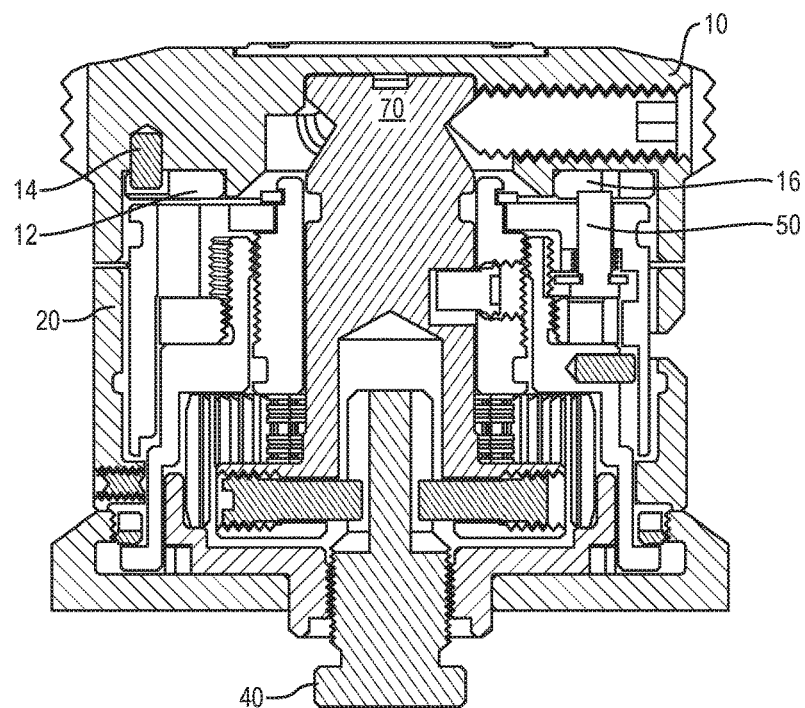
FIG. 4 is a cross-sectional view of a turret assembly which illustrates a locking mechanism in a locked position.
Figure 5:
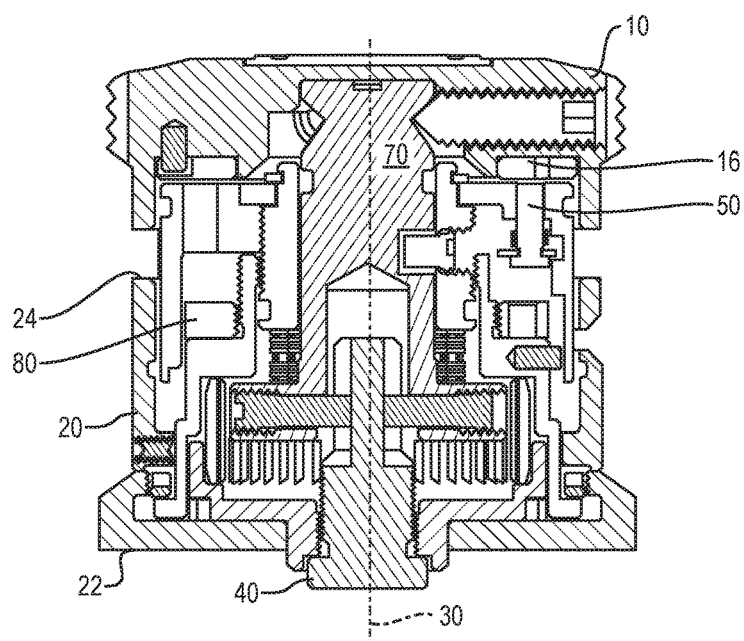
FIG. 5 is a cross-sectional view of a turret assembly which illustrates the locking mechanism in an unlocked position.
Figure 6:
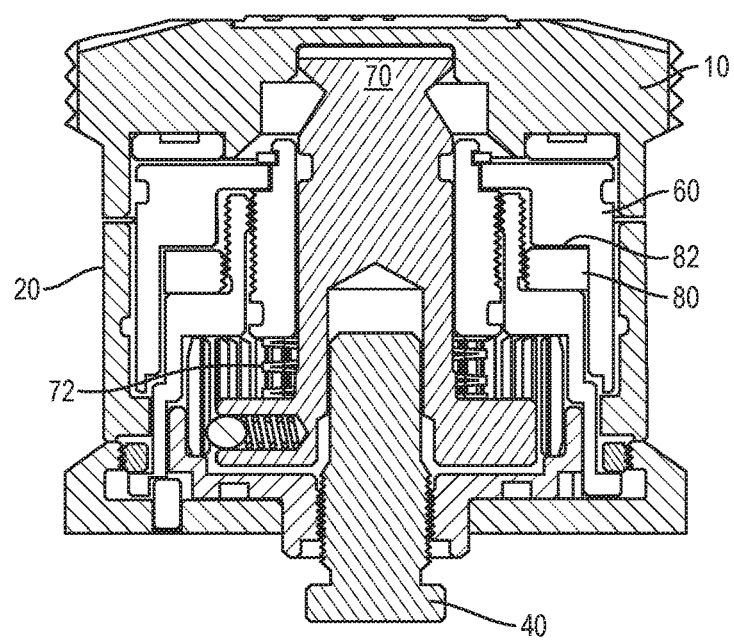
FIG. 6 is a cross-sectional view of a turret assembly which illustrates a stopping mechanism.

In one embodiment, the turret cap 10 is moveable translationally along the turret axis 30 between a first position (see FIG. 4) and a second position (see FIG. 5). As shown in FIG. 4, when the turret cap 10 is in the first position and the locking pin 50 is in its locked position, the locking pin 50 engages the turret cap 10 to prevent rotational movement of the turret cap 10 relative to the turret body 20. As shown in FIG. 5 and as discussed in more detail below, when the turret cap 10 is in the second position (i.e. when the shooter pulls axially up on the turret cap 10) the locking pin 50 is disengaged from the turret cap 10 so the turret cap 10 is free to rotate relative to the turret body 20. As shown in FIG. 5, when the turret cap 10 is pulled up into the second position, additional components discussed below, including but not limited to, the turret post 70 and rotation indicator 60, also move up with the turret cap 10.

Figure 8:
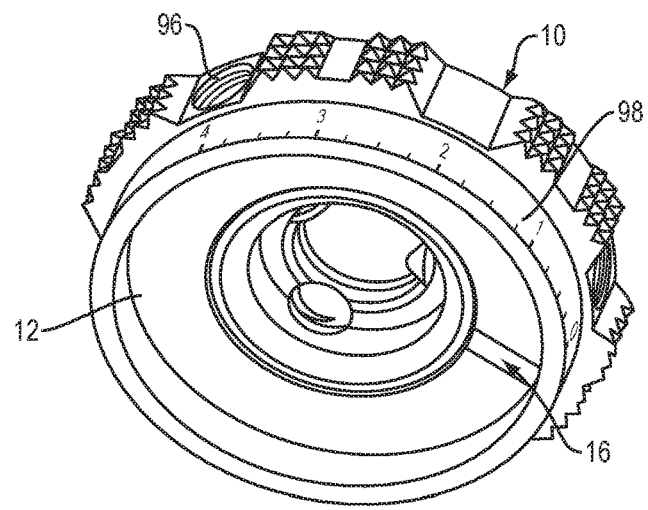
FIG. 8 is a perspective view of a turret cap.

In one illustrative embodiment, the turret body 20 includes an opening 34 (see FIG. 9), and at least a portion of the lock pin 50 protrudes out of the opening 34 in the locked position to prevent rotational movement of the turret cap 10 relative to the turret body 20. Furthermore, as shown in FIG. 8, in one embodiment, the turret cap 10 includes a slot 16 which is configured to receive at least a portion of the locking pin 50 when the locking pin 50 is in the locked position. As shown in FIG. 8, for ease of manufacturing, the turret cap 10 may include a detent ring 12 and the slot 16 may be formed into the detent ring 12. As shown in FIGS. 2, 4 and 5, the detent ring 12 may be secured to the rest of the turret cap 10 using conventional methods, such as, but not limited to, a set pin 14.

As shown in FIG. 8, the turret cap 10 may also include a plurality of markings 98 which may be used to depict the rotational position of the turret cap 10. In one illustrative embodiment, the plurality of markings range from 0-12 around the perimeter of the turret cap 10, where the turret cap slot 16 is aligned with the 0 such that the user will easily recognize when the turret cap is locked on zero. However, in other embodiments, the markings may vary as the invention is not so limited.

The turret assembly stopping mechanism and how it may interact with the locking mechanism will now be further described. As shown in FIGS. 2-5, in one embodiment, the stopping mechanism includes a zero stop ring 80. As mentioned above, the position of the zero stop ring 80 relative to the turret body 20 may define a zero stop point which, once reached, prevents further rotational movement of the turret cap 10.

Figure 10:
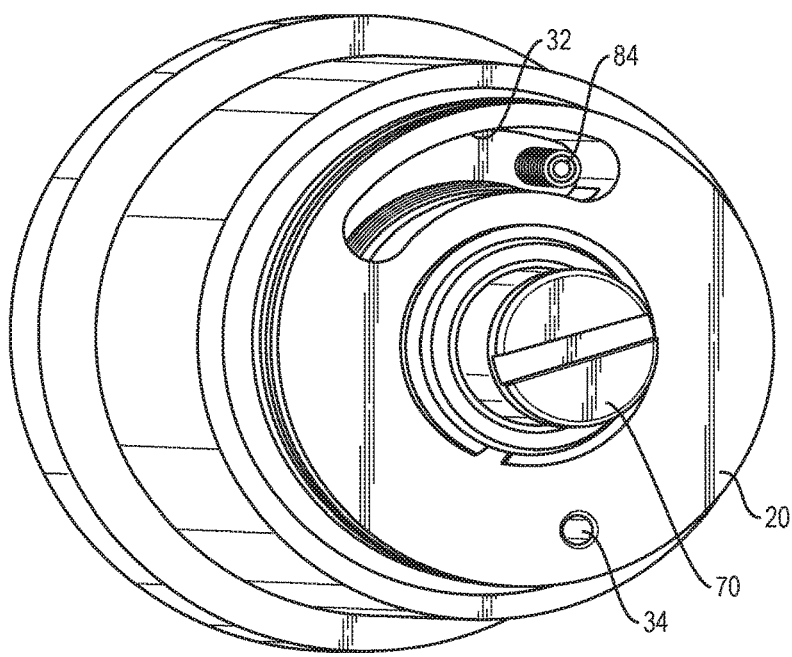
FIG. 10 is another perspective view of a turret assembly with the turret cap removed.
Figure 11:
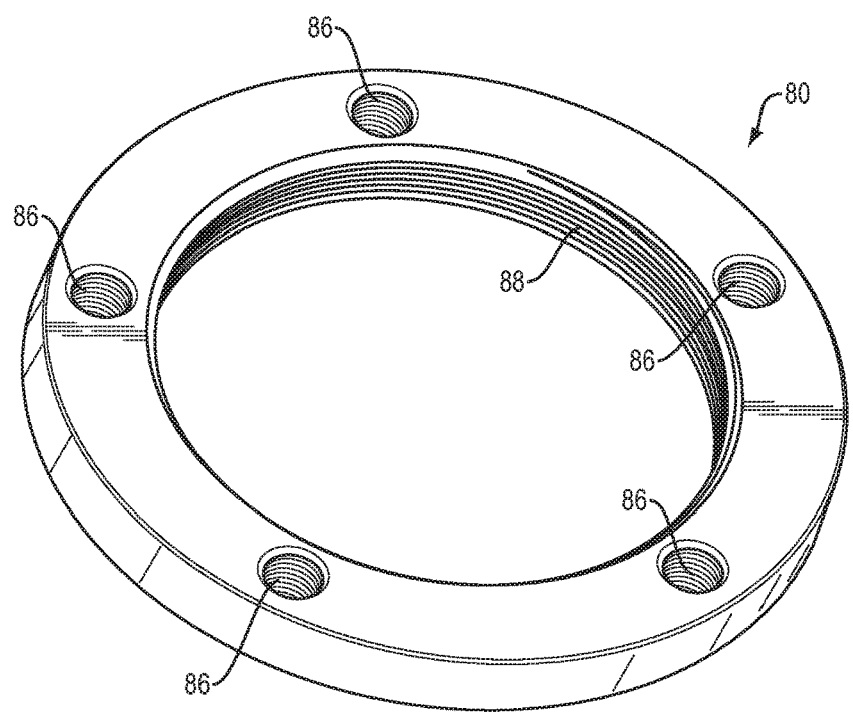
FIG. 11 is a perspective view of a zero stop ring.

The zero stop ring 80 is shown in greater detail in FIG. 11. In this illustrative embodiment, the zero stop ring 80 includes female threads 88 so that as the zero stop ring 80 is rotated, it moves up and down helically along the turret axis 30 along corresponding male threads on the turret main housing 26. As shown in FIGS. 10 and 11, the zero stop ring 80 may also include a plurality of threaded holes 86 and a zero stop set screw 84 (see FIG. 10) is positioned within one of the holes 86 to prevent rotation of the zero stop ring 80 once the position of the zero stop ring 80 is set by the user.

In one illustrative embodiment, shown in FIGS. 8-11, the turret cap 10 is removeably coupled to the turret body 20 such that the turret cap 10 can be removed from the turret body 20 to adjust the position of the zero stop ring 80. In one embodiment, the turret cap has one or more set screws 18 (see FIG. 2) that are removably received in one or more set screw openings 96 (see FIG. 8). It should be appreciated that the turret cap 10 may be coupled to the turret body 20 using other conventional methods as the invention is not limited in this respect.

Figure 9:
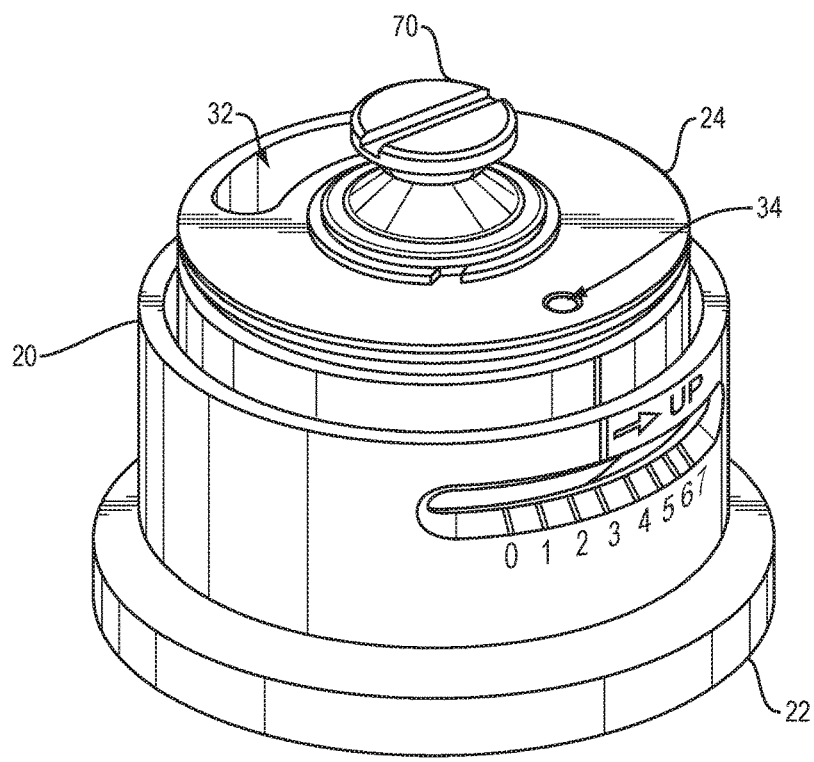
FIG. 9 is a perspective view of a turret assembly with the turret cap removed.
Figure 12:
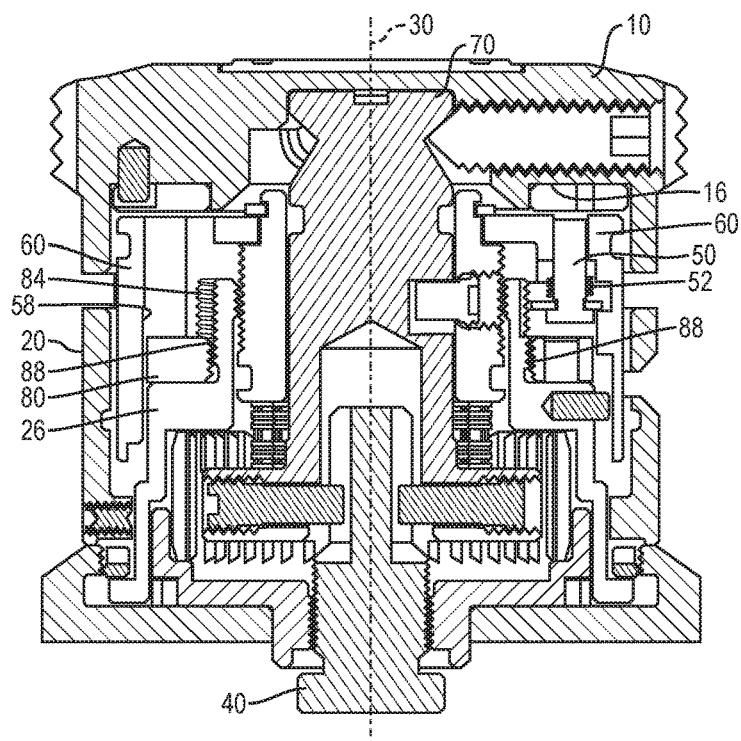
FIG. 12 is a cross-sectional view of a turret assembly.
Figure 13:
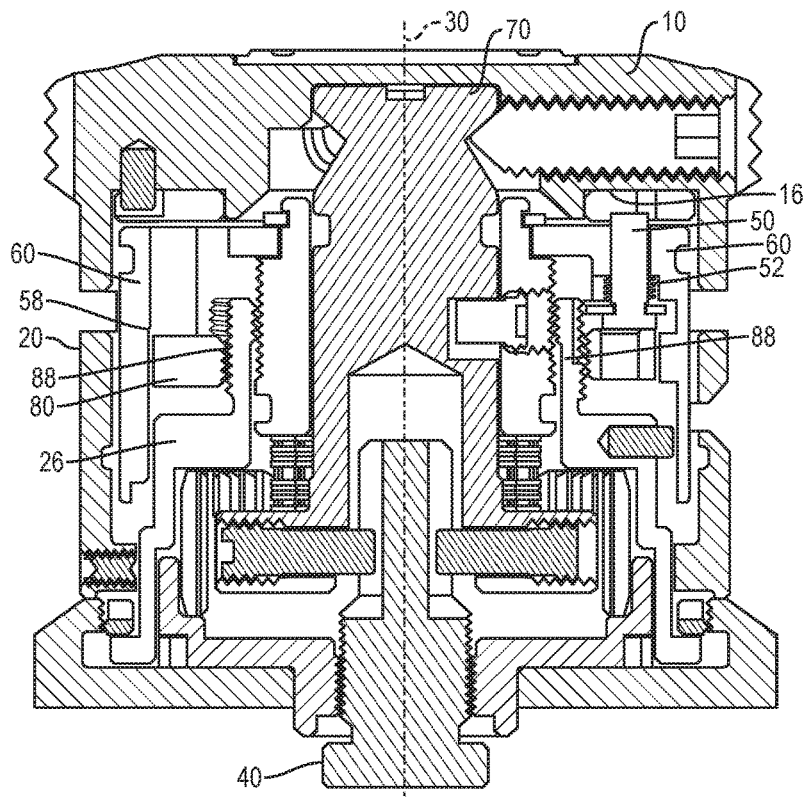
FIG. 13 is a cross-sectional view of a turret assembly which illustrates the locking mechanism and the stopping mechanism.

As shown in FIGS. 9 and 10, once the turret cap 10 is removed, the user is able to access the zero stop ring 80. For example, in one illustrative embodiment, the turret body 20 includes an opening 32 on the second end 24 of the turret body 20 which enables access to the zero stop ring 80 to set the zero stop point. To set the zero stop point, the user first removes the zero stop set screw 84 through the opening 32. In one illustrative embodiment, the set screw 84 is threaded and may be removed with a tool, such as a screw driver or an allen key (not shown). Once the set screw 84 is removed, the user rotates the zero stop ring 80 into the desired position with the same tool or a different tool. In this particular embodiment shown in FIG. 10, the opening 32 has a curved elongated shape which enables the zero stop ring 80 to rotate approximately 72° as the tool positioned within one of the five threaded holes 86 advances along the 72° arc from one end of the elongated opening 32 to the other end of the elongated opening 32. In this configuration, at least one of the threaded holes 86 is accessible through the opening 32 at any point in time as the zero stop ring 80 rotates about the turret axis 30. The user then positions the tool within the next threaded opening 86 which becomes visible within the window 32 as the zero stop ring 80 rotates. As shown in FIGS. 12 and 13, this process is repeated until the desired position of the zero stop ring 80 is reached. In one illustrative embodiment shown in FIGS. 12 and 13, the zero stop ring 80 is rotated counter clockwise until it advances to a notch 58 on the inside of the rotation indicator 60. Notch 58 prevents any further advancement of the zero stop ring 80. As shown comparing FIGS. 12 and 13, in this particular embodiment, such counter clockwise movement of the zero stop ring 80 moves the zero stop ring 80 upwardly along the turret main housing 26 and along the turret axis 30 and away from the first end 22 of the turret body 20. It should be appreciated that in other embodiments, the zero stop ring 80 may be moved counter clockwise and/or downwardly along the turret axis 30 as the invention is not so limited.

In the embodiment illustrated in FIG. 13, as the zero stop ring 80 moves along its threads 88 upwardly along the turret body main housing 26, the upper surface of the zero stop ring 80 may contact the lower surface of the locking pin 50. As shown in FIG. 12, a locking pin spring 52 may bias the locking pin 50 in the unlocked (downward as shown) position. As the zero stop ring 80 moves up, the zero stop ring 80 moves against the bias of the spring 52 to move the locking pin 50 into the locked position shown in FIG. 13, thus actuating the locking pin 50. As shown in FIG. 13, in its locked position, the locking pin 50 extends within the turret cap slot 16 to engage the turret cap 10 to prevent rotational movement of the turret cap 10 relative to the turret body 20. As shown, axial movement of the turret cap 10 is not impeded by locking pin 50.

Figure 14:
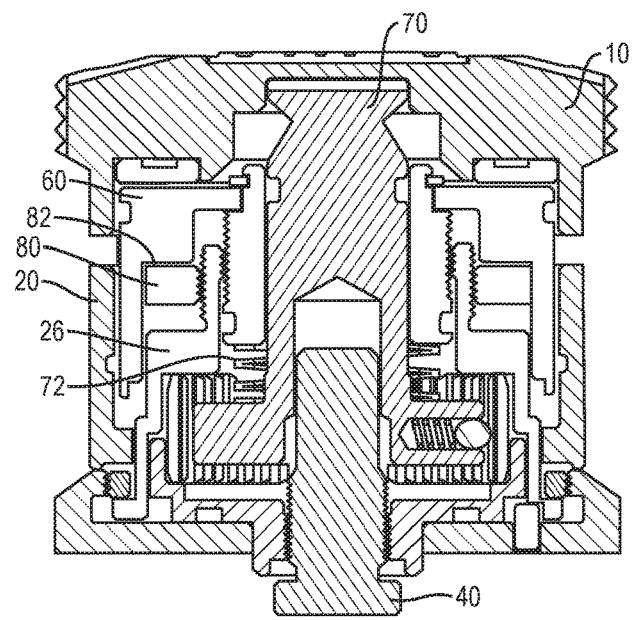
FIG. 14 is a cross-sectional view of a turret assembly which illustrates the stopping mechanism.

Once the desired position of the zero stop ring 80 is reached, the user may secure the position of the zero stop ring 80 by reinstalling the zero stop set screw 84 in whichever threaded hole 86 is accessible through the opening 32. As mentioned above, this sets a zero stop point which, once reached, prevents further rotational movement of the turret cap 10. If the user wants any available clicks in the negative direction of the zero stop point, the zero stop ring 80 may be backed off ⅛ to ¼ turn before reinstalling the set screw 84. FIG. 14 illustrates the new zero stop interface 82 defined by the upper surface of the zero stop ring 80 and the adjacent surface of the rotation indicator 60. In the embodiment illustrated in FIGS. 13 and 14, the locking mechanism is in its locked position.

Figure 7:
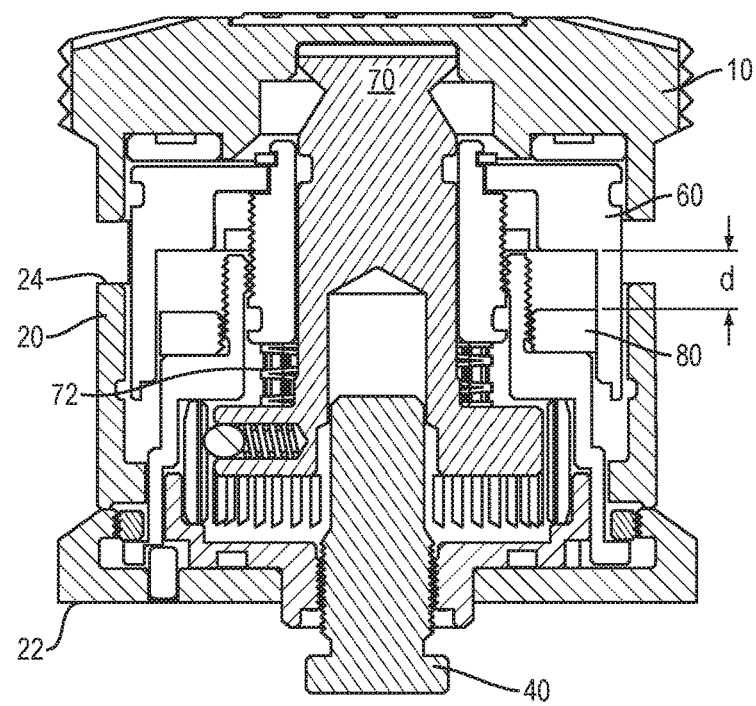
FIG. 7 is a cross-sectional view of a turret assembly which illustrates the locking mechanism in an unlocked position.

Once the user has set the turret locking mechanism and the turret stopping mechanism, the rifle scope 200 and adjacent rifle (not shown) are ready for use. However, as the distance between the target changes and/or as the surrounding wind conditions vary, the user may want to adjust the elevation turret 240 and/or the windage turret 250 (see FIG. 1). As shown in the embodiment illustrated in FIG. 15, to adjust windage or elevation, the user may pull up on the turret cap 10 which creates clearance between the locking pin 50 and the turret cap 10, thus disengaging the locking mechanism from the turret cap 10 so that the turret cap 10 is free to rotate relative to the turret body 20. As shown in FIG. 7, when the user pulls up on the turret cap 10 by a distance "d", there is now a corresponding distance "d" between the upper surface of the zero stop ring 80 and the adjacent surface of the rotation indicator 60 (which previously defined the zero lock interface 82) thus permitting rotation of the turret cap 10.

Figure 15:
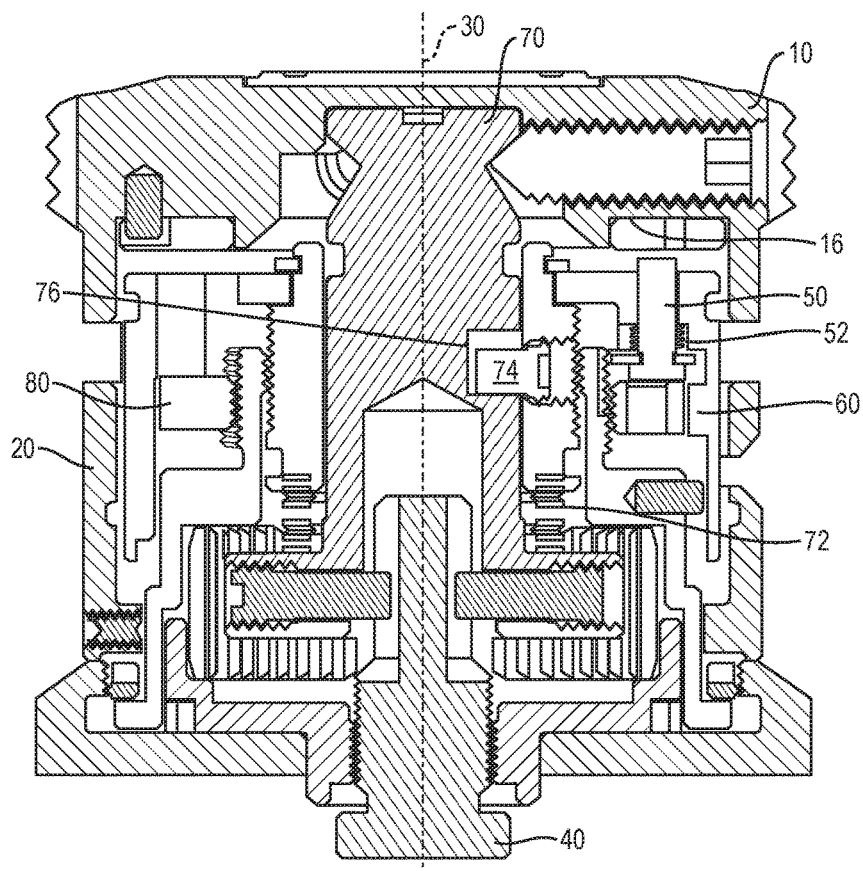
FIG. 15 is a cross-sectional view of a turret assembly which illustrates the locking mechanism and the stopping mechanism.
Figure 16:
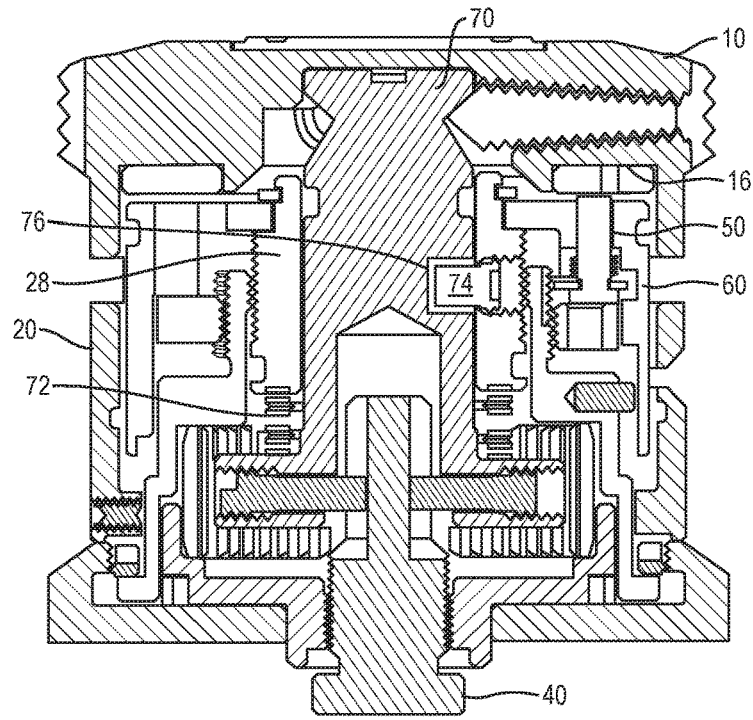
FIG. 16 is a cross-sectional view of a turret assembly with the turret cap rotated one click off of zero lock.

In this illustrative embodiment shown in FIGS. 15-17, the turret cap 10 is coupled to a turret post 70 which is positioned with the turret body 20. A post spring 72 is coupled to the turret post 70 and is configured to bias the turret post 70 and turret cap 10 along the turret axis 30 in a direction toward the turret body 20. In this particular embodiment, the post spring 72 is a wave spring, but other types of springs are also contemplated. As mentioned above, when the turret cap 10 is pulled up into the second position, additional components, including the turret post 70 and rotation indicator 60, also move up with the turret cap 10. When the user pulls up on the turret cap 10, turret post 70, and rotation indicator 60, the user pulls against the bias of the post spring 72.

As shown in FIGS. 15 and 16, the turret post 70 includes a notch 76 and within the notch 76 is turret post set screw 74. As shown, the notch 76 may be configured to be larger than the set screw 74 so that the set screw 74 is moveable within the notch 76 in the direction of the turret axis 30. As shown in FIG. 13, when the locking mechanism is in its locked position, the turret post set screw 74 may be positioned within an upper portion of the notch 76, and may be in contact with the upper surface defining the notch 76. As shown in FIG. 15, as the user pulls up on the turret cap 10 to disengage the locking mechanism, the turret post 70 and its notch 76 also move up along the turret axis 30, causing the turret post set screw 74 to now be positioned in the lower portion of the notch 76, and may be in contact with the lower surface defining the notch 76. FIG. 15 illustrates the stop point for the set screw 74 when the turret cap is being pulled up. This configuration limits the distance "d" that the turret cap 10 can be pulled between the first position and the second position (see FIG. 7).

After the turret cap 10 is lifted up into its second position, thus disengaging the locking mechanism, the turret cap 10 can be rotated. Because the turret cap 10 is coupled to the turret post 70, as the turret cap 10 rotates, the turret post 70, and its associated notch 76 and turret post set screw 74 also rotate. FIG. 16 illustrates the turret assembly after the turret cap 10 has been rotated one click off of the zero stopping point. As shown, in this configuration, the turret cap 10 and turret post 70 have now been picked up by the locking pin 50 (through the rotation indicator seat 28 and the rotation indicator 60). The turret cap 10 and turret post 70 are now being pulled downwardly onto the locking pin 50 by the turret post spring 72, thus moving the locking pin 50 into its unlocked position to prevent the locking pin 50 from interfering with the rotational movement of the turret cap 10. As also illustrated in FIG. 16, in this configuration the turret post 70 is no longer resting on the turret post set screw 74.

Figure 17A:
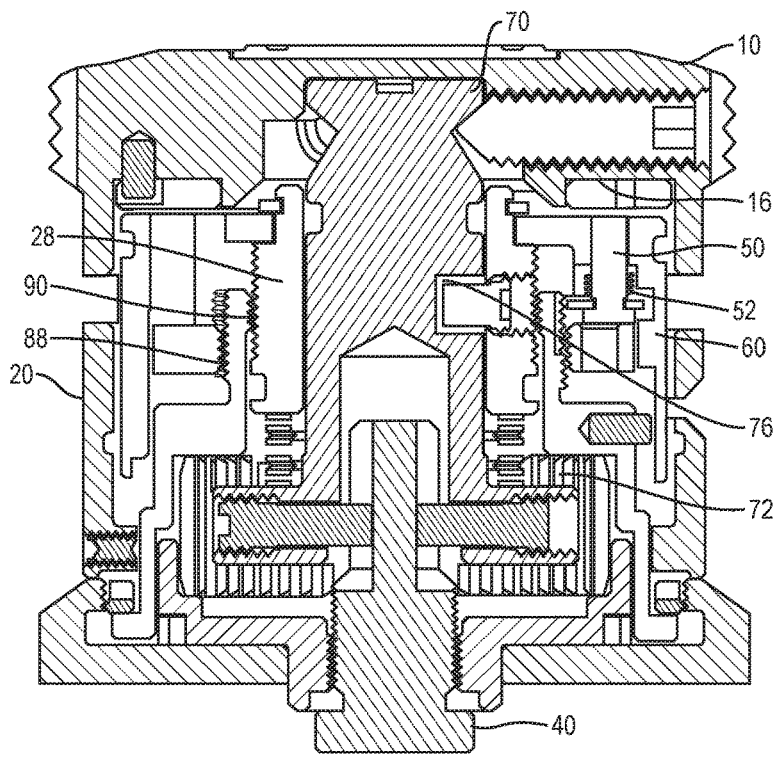
FIG. 17A is a cross-sectional view of a turret assembly with the turret cap rotated 1 full rotation.

FIG. 17A illustrates one embodiment where the turret cap 10 has been rotated one full rotation from its position shown in FIG. 16. In this embodiment, the turret cap 10 has raised up enough relative to the locking pin 50 so that the locking pin 50 does not engage the turret cap slot 16. As shown, in this configuration, the turret post set screw 74 has now picked up the turret post 70 as the turret cap 10 was rotated. Because the locking pin 50 was moved into its unlocked position, the turret cap 10 may continue to be rotated until the zero stop point is reached.

FIG. 17A illustrates the threads 90 on the rotation indicator seat 28 which control the vertical movement of the rotation indicator 60, turret cap 10 and turret post 70. In one embodiment, the pitch of the threads 90 is greater than the designed overlap between the locking pin 50 and the turret cap slot 16. In this respect, as the turret cap 10 travels the vertical distance of the pitch length up (i.e. rotated one full rotation), the turret cap 10 has thus been raised to no longer engage the locking mechanism.

Figure 17B:
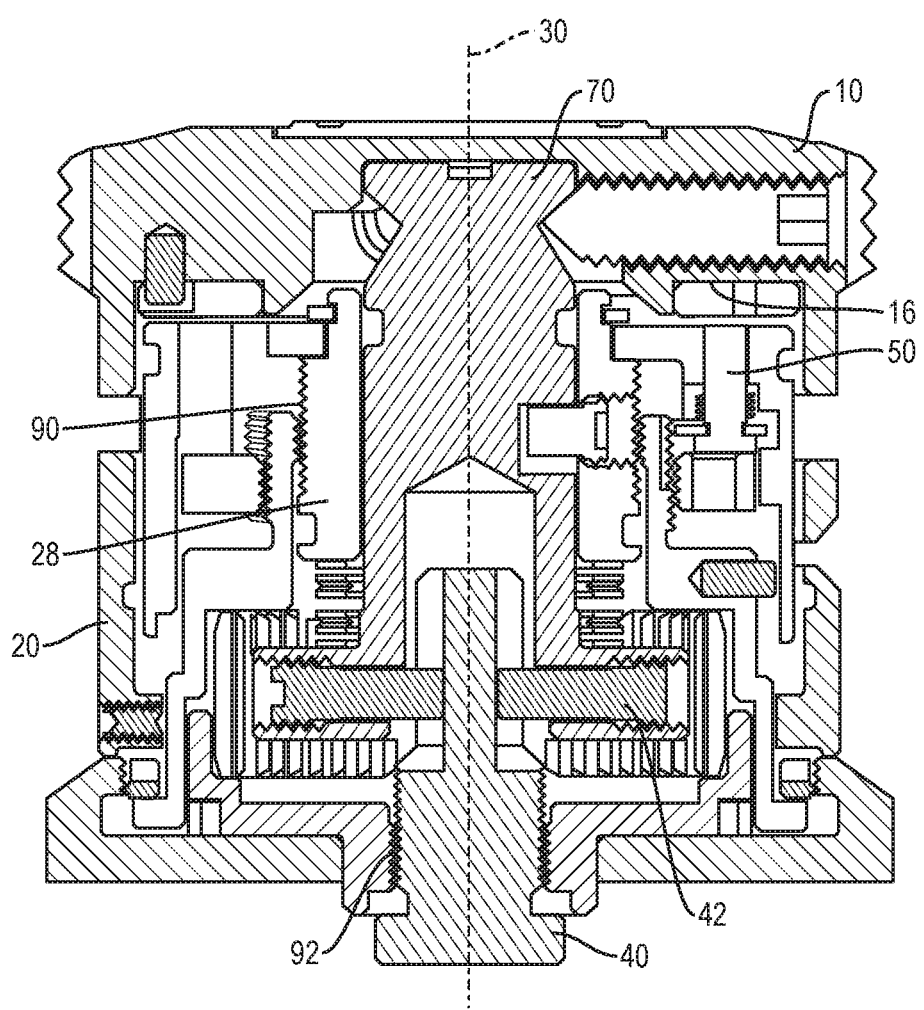
FIG. 17B is a cross-sectional view of a turret assembly with the turret cap rotated 1 full rotation.

In one embodiment illustrated in FIG. 17B, the thread pitch of the threads 90 on the rotation indicator seat 26 is substantially equal to the thread pitch of the threads 92 on the jacking screw 40. In this embodiment, one rotation of the turret cap 10 equals one rotation of the jacking screw 40. In one embodiment, the thread pitch of the threads 90 on the rotation indicator seat 26 is the same between different models of the turrets and scopes. This results in one rotation equaling the same change in height throughout all of the models. In one embodiment, the thread pitch on the threads 92 on the jacking screw 40 may differ between different models. One advantage of this configuration where the threads 90 on the rotation indicator seat 26 control vertical motion of the turret assembly is ease of manufacturing, because it enables one to only have one rotation indicator profile (for lasering of the rotation indicator) across multiple models. In contrast, typical rotation indicators are linked directly to the jacking screw 40 and therefore the amount of vertical travel per rotation varies widely between different models. This may make it more difficult to manufacture, requiring multiple different lasering profiles. The above-described design allows the jacking screw 40 and the rest of the turret assembly to be linked for a 1:1 rotation but independent of one another with regards to change in height per rotation.

Turning to FIGS. 18-22, the turret assembly indicator will now be further described. As mentioned above, the turret assembly includes an indicator that depicts information about the position of the turret assembly, and in one illustrative embodiment, the indicator is configured for only translational movement relative to the turret body. In other words, this indicator does not rotate relative to the turret body. In one embodiment, the indicator is configured to visually show the user the number of times that the turret cap 10 has been rotated relative to the turret body 20. In one illustrative embodiment, the indicator 60 is configured as a substantially cylindrical sleeve, which is configured for only translational movement relative to the turret body 20 along the turret axis 30. However, other shaped indicators are also contemplated, as the invention is not limited in this respect.

Figure 20:
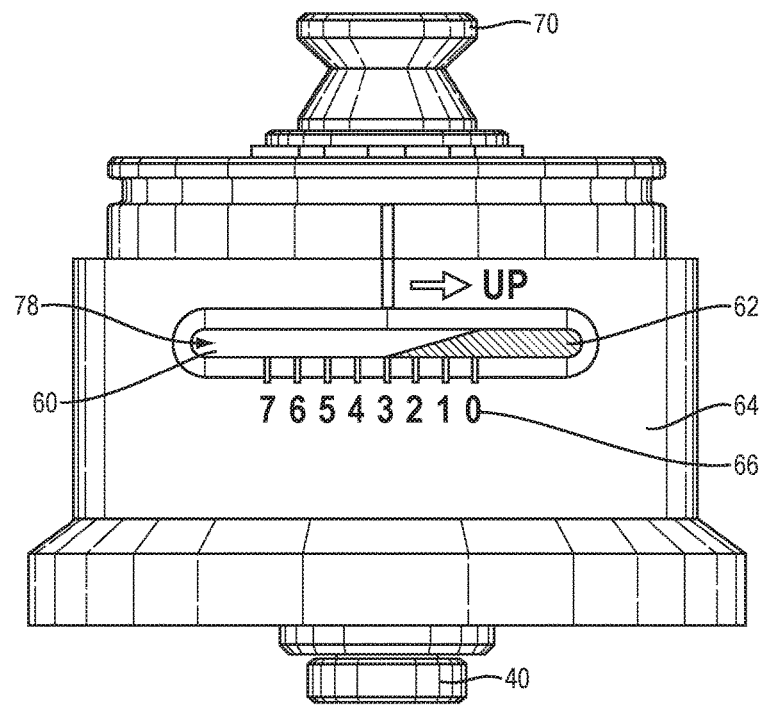
FIG. 20 is a side view of a turret assembly including the rotation indicator and the turret indicator window.
Figure 21:
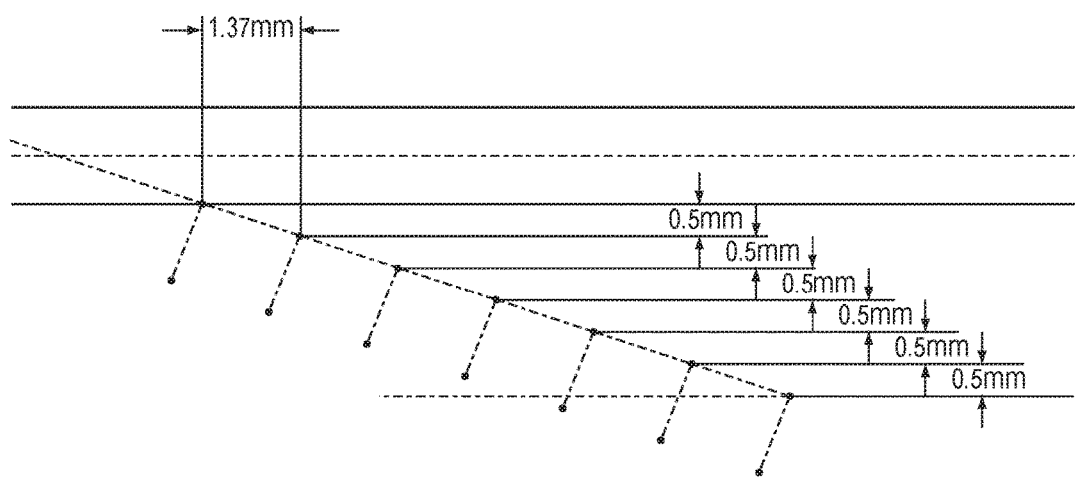
FIG. 21 is a graphic illustrating the angle of a substantially triangular shaped indicia on the rotation indicator.
Figures 22A, 22B, 22C:
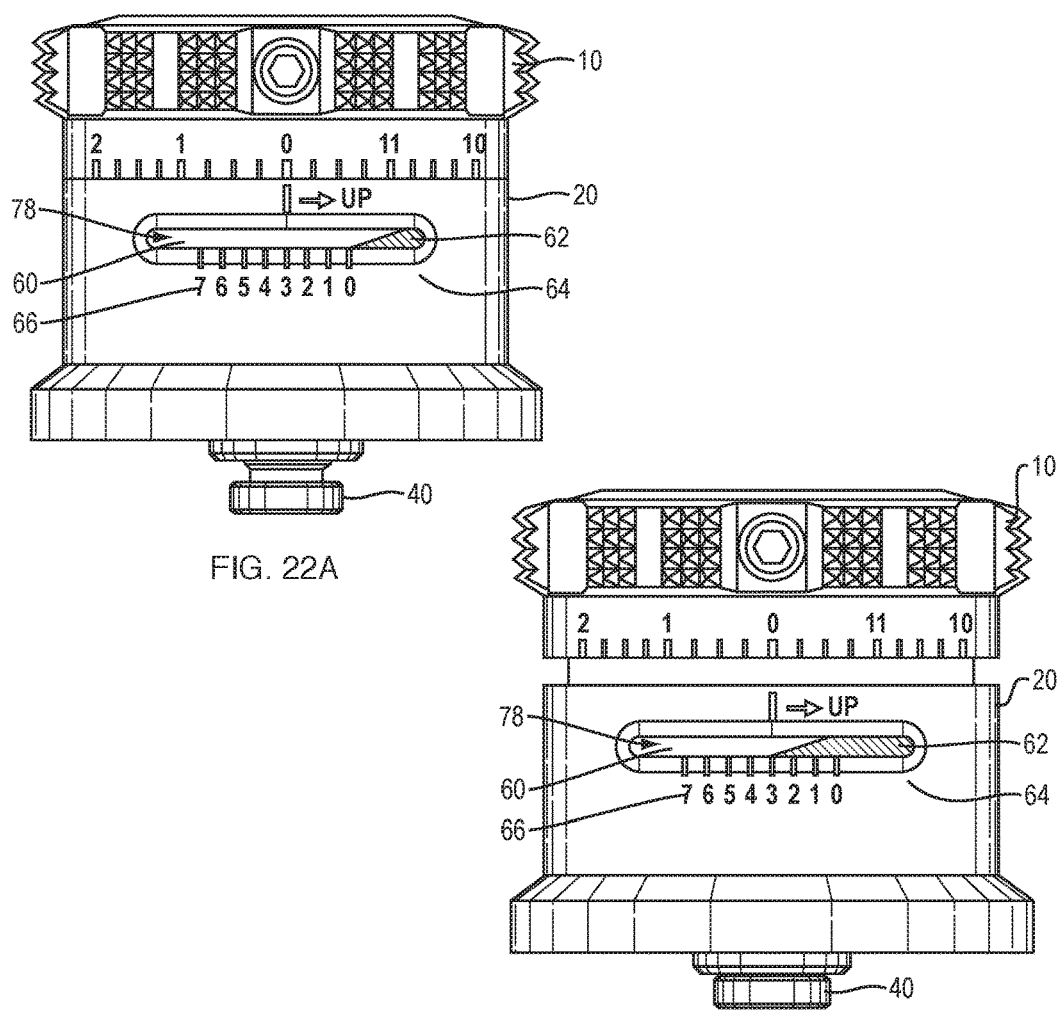
FIG. 22A is a side view of a turret assembly at zero rotation.
FIG. 22B is a side view of a turret assembly at middle rotation.
FIG. 22C is a side view of a turret assembly at maximum rotation.

In one illustrative embodiment, a turret indicator window 64 is coupled to the turret body. As shown in FIGS. 20 and 22, the turret indicator window 64 is configured like a window frame and includes an opening 78 and at least a portion of the indicator 60 is visible through the opening 78 in the indicator window 64 to depict information about the position of the turret cap 10 relative to the turret body 20. As shown in FIG. 22A-22C, in one illustrative embodiment, the turret indicator window 64 and its associated opening 78 are substantially stationary relative to the turret body 20 and only the indicator 60 slides relative to the turret body 20 as the turret cap 10 is rotated.

Furthermore, as shown in FIGS. 20 and 22A-22C, the turret indicator window 64 may include a plurality of markings 66 illustrating the number of rotations of the turret cap 10 relative to the turret body 20. For example, in this particular embodiment, the turret indicator window 64 has markings ranging from 0-7 to illustrate the number of rotations that the turret cap 10 can make relative to the turret body 20. In the embodiment illustrated in FIG. 22A, the turret cap 10 is at zero rotations relative to the turret body 20. Note that the jacking screw 40 is axially extending from the bottom of the turret body 20. In the embodiment illustrated in FIG. 22B, the turret cap 10 has been rotated three times relative to the turret body 20. Note that by rotating the turret cap 10 three times, the user has raised the position of the jacking screw 40. Finally, in the embodiment illustrated in FIG. 22C, the turret cap 10 is at seven rotations. Note that by rotating the turret cap 10 an additional four times (from 3 rotations to 7 rotations) the user has raised the position of the jacking screw even more, such that only the lower portion of the jacking screw extends out of the turret body 20. In one illustrative embodiment, the turret assembly in FIG. 22C is at its maximum rotation.

Figure 18A:
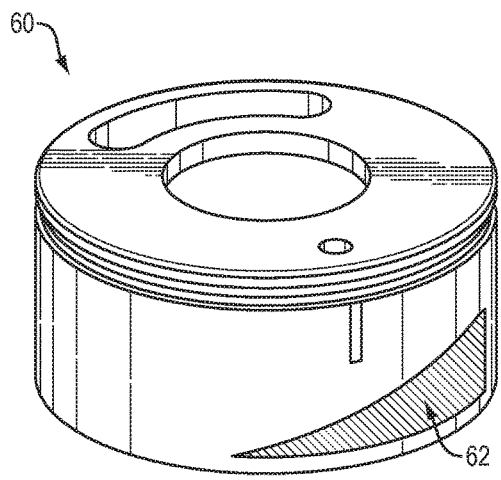
FIG. 18A is a perspective view of a rotation indicator according to one embodiment of the present invention.
Figure 18B:
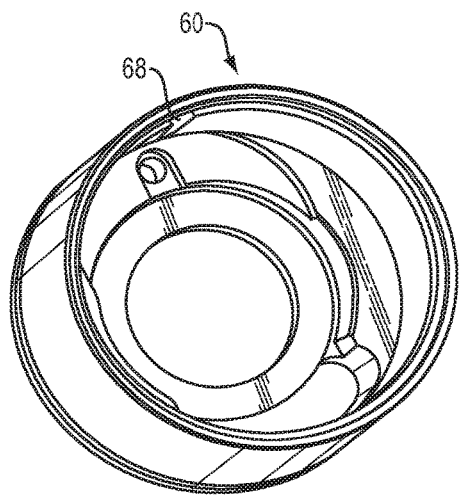
FIG. 18B is another perspective view of the rotation indicator.
Figure 19:
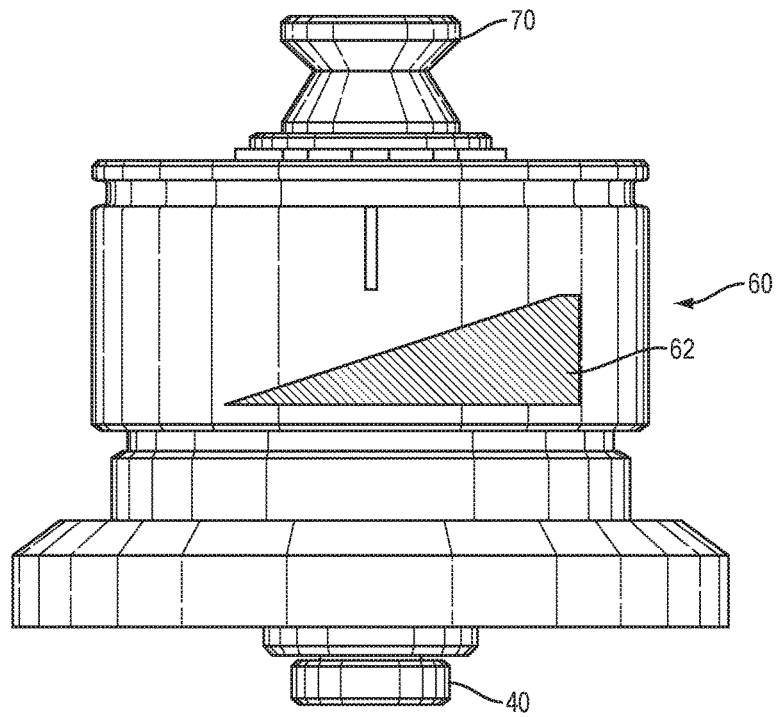
FIG. 19 is a side view of a turret assembly including the rotation indicator.

As shown in FIG. 18B, in one illustrative embodiment, the indicator 60 includes a slot 68 configured to receive a mating indicator sleeve set pin 94 (see FIG. 2) in the turret body 20, which keys the indicator 60 to the main housing 26 to convert the rotational movement of the turret cap 10 into translational movement of the indicator 60 along the turret axis 30.

As shown in FIGS. 18-22, in one illustrative embodiment, the indicator 60 includes a substantially triangular shaped indicia 62 which is configured to be moveable along the turret axis 30 relative to the turret indicator window 64. As illustrated in the graphic shown in FIG. 21, this triangular shape helps to improve resolution of the indicator 60 making it easier for the user to identify the position of the turret cap 10 and jacking screw 40. In the particular example set forth in FIG. 21, by implementing a substantially triangular shaped indicia 62, the resolution of the indicator has effectively changed from 0.5 mm to 1.37 mm. In other words, if the turret cap 10 and jacking screw 40 move approximately 0.5 mm along the turret axis 30, the effect is that the resolution improves to the hypotenuse of the resulting right triangular segment, which in the illustrative embodiment, equals 1.37 mm. It should be appreciated that the improved resolution will vary based upon the particular triangular shape of the indicia 62.

Figure 23:
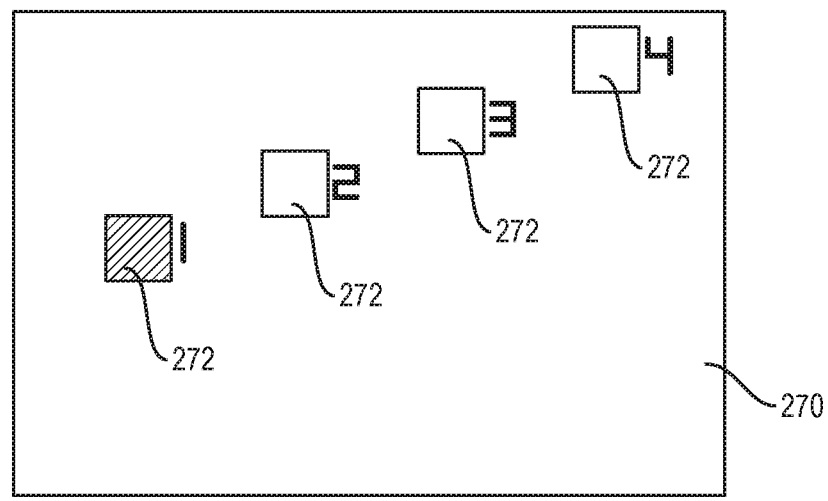
FIG. 23 is a schematic view of another embodiment of an indicator and turret indicator window.
Figure 24:
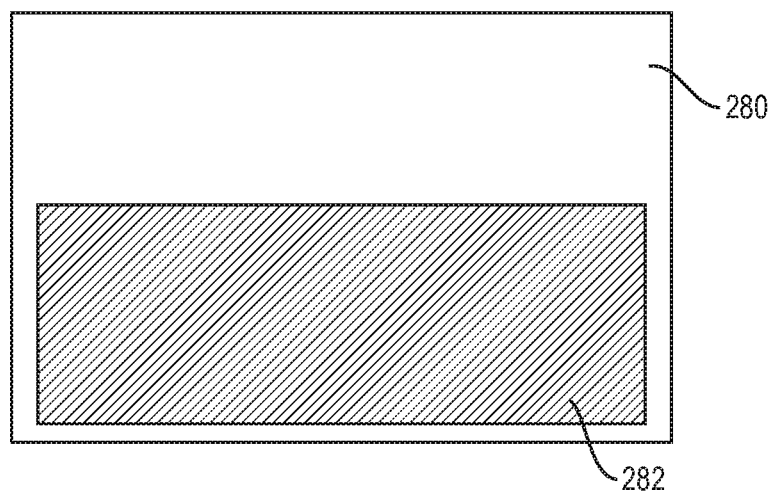
FIG. 24 is a schematic view of another embodiment of a rotation indicator.

Turning to FIGS. 23-24, another embodiment of a turret assembly rotation indicator is illustrated. FIG. 23 illustrates the turret indicator window 270 and FIG. 24 illustrates the indicator 280. As shown in FIG. 23, in this embodiment, the turret indicator window 270 includes a plurality of openings 272, and as shown in FIG. 24, the indicator 280 includes a substantially rectangular-shaped indicia 282. As mentioned regarding the above-described embodiments, the turret indicator window 270 may remain substantially stationary and the indicator 280 may be configured for only translational movement along the turret axis 30. As the indicator 280 moves, the rectangular-shaped indicia 282 will move relative to the plurality of openings 272 in the turret indicator window 270. As shown in FIG. 23, the cross-hatched indicia 282 is positioned to cover the opening 272 labeled "1" which may indicate that the turret cap 10 has rotated one time relative to the turret body 20. As the turret cap 10 continues to rotate, the indicator 280 may move upwardly along the turret axis 30 such that the cross-hatched indicia 282 is positioned to cover the opening 272 labeled "2" which may indicate that the turret cap 10 has been rotated twice. Then the cross-hatched indicia 282 may be positioned to cover the opening 272 labeled "3" which may indicate that the turret cap 10 has been rotated three times, and finally, the cross-hatched indicia 282 may move up to be positioned to cover the opening 272 labeled "4" which may indicate that the turret cap 10 has been rotated four times. It should be appreciated that the exact number of openings 272 may correspond to the number of times that the turret cap 10 is configured to rotate. Furthermore, in this particular embodiment, the plurality of openings 272 in the turret indicator window 270 are arranged in a step pattern, but it is also contemplated that the plurality of openings 272 are configured differently, as the invention is not so limited.

Figure 25:
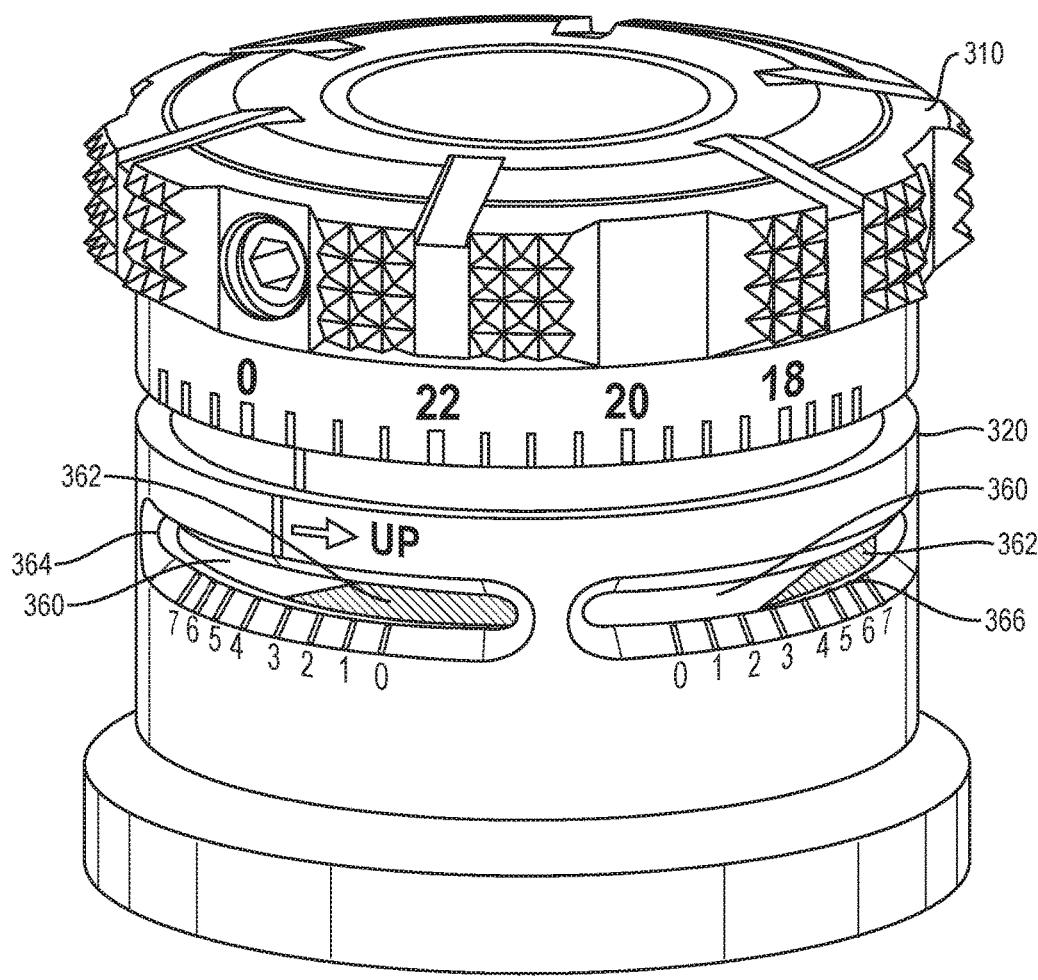
FIG. 25 is a perspective view of another embodiment of a turret assembly including a plurality of openings in the turret indicator window.

FIG. 25 illustrates another embodiment of a turret assembly which includes a plurality of openings in the turret indicator window. In this particular, embodiment, the turret cap 310 is similar to the above-described turret cap 10, the turret body 320 is similar to the above-described turret body 20, and the indicator 360 is similar to the above described indicator 60. However, in this illustrative embodiment, the turret body 320 includes a turret indicator window which includes at least a first indicator window opening 364 and a second indicator window opening 366, and each opening 364, 366 has a corresponding triangular-shaped indicia 362 on the indicator 360. In other words, the turret assembly has an indicator that is configured to depict information about the rotational position of the turret cap 310 relative to the turret body 320 in more than one location on the indicator. This embodiment may be advantageous in a military situation where the sniper holding the rifle typically travels with a second person, called a spotter, because this indicator configuration enables both the sniper and the spotter to easily detect the rotational position information.

Figure 26:
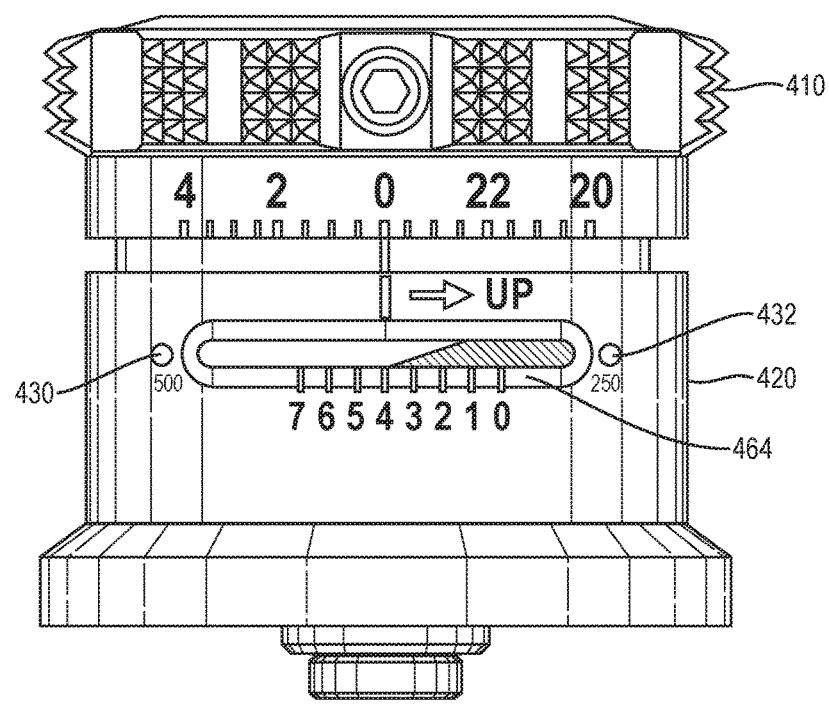
FIG. 26 is a side view of another embodiment of a turret assembly including a plurality of openings in the turret indicator window.
Figure 27:
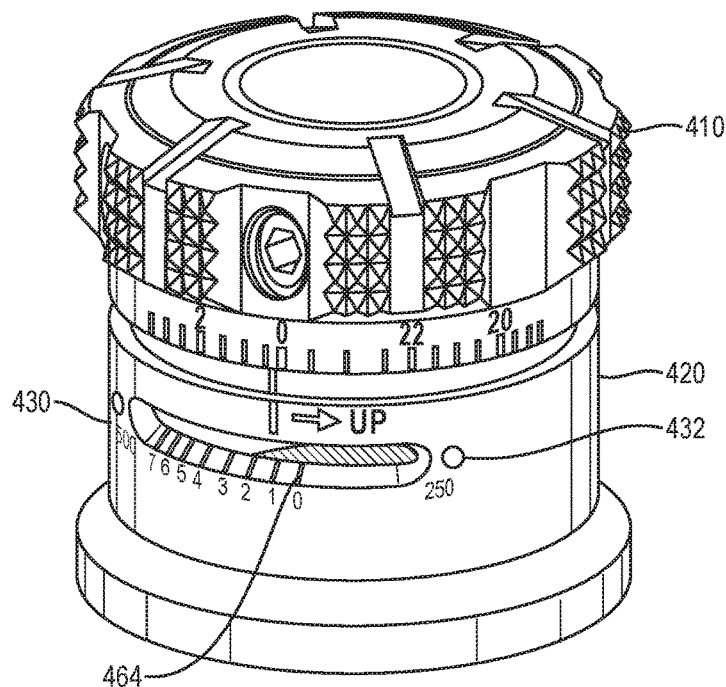
FIG. 27 is a perspective view of the turret assembly shown in FIG. 26.

FIGS. 26 and 27 illustrate yet another embodiment of a turret assembly which includes a plurality of openings in the turret indicator window. In this particular embodiment, the turret cap 410 is similar to the above-described turret cap 10, the turret body 420 is similar to the above-described turret body 20, and the indicator and turret window opening 464 are similar to the above described indicator 60 and turret window opening 78. However, in this illustrative embodiment, the turret body 420 includes a turret indicator window which also includes one more yardage window openings 430, 432. In one illustrative embodiment, the yardage window openings 430, 432 are configured to correspond to 500 yards and 250 yards, respectively. These yardage window openings 430, 432 are configured such that the user can configure their rifle at these additional yardages. For example, once the user has sighted their specific rifle to 500 yards, the user can mark the indicator through the yardage window opening 430, with a marking, such as but not limited to, a small sticker or a small dab of paint. Similarly, once the user has configured their specific rifle to 250 yards, the user can mark the indicator through the yardage widow opening 432, with a marking, such as but not limited to, a small sticker or a small dab of paint. With these user-defined calibrations, the user can then more easily turn the turret cap and stop at either 250 yards or 500 yards, whichever is desired, once the appropriate marking is visible through the yardage window opening 430, 432. It should be appreciated that there could be additional yardage window openings for other desired yardages, as the invention is not so limited.

As discussed above, various components of the turret assembly are moveable relative to each other. Accordingly, as shown in FIG. 3, the turret assembly may include a plurality of O-ring grooves 150 and corresponding O-rings to facilitate the sliding movement of these components relative to each other. As shown in FIG. 2, the assembly may also include one or more C clips 140 to hold the various components together. Furthermore, as shown in FIG. 2, the top of the turret cap 10 may include a decal or logo 132.

Furthermore, as illustrated in FIG. 2, the jacking screw 40 may extend downwardly past the main tube 110, which may be part of the optic body of the attached rifle scope 200. As shown in FIGS. 2 and 3, main housing set screw 112, main housing retaining ring 130, and main housing and assembly seat set pin 114 may couple the turret body main housing 26 and associated turret body 20 to the rifle scope 200. Ball detent 116, spring 118 (shown in FIG. 3) and jacking screw retaining screw 42 (see FIG. 17B) control the rotation of the jacking screw 40 and are coupled to the click ring 100 such that one click of the click ring 100 initiates rotational movement of the jacking screw 40.

The materials of the above-described components may vary as the invention is not limited to particular materials.

However, in one particular embodiment, the outer components which would be exposed to the elements, mainly the turret cap 10, the indicator 60 and the turret indicator window 64 are made from a durable material, such as anodized aluminum. In one embodiment, the lock pin 50 and the detent ring 12 (positioned on the underside of the turret cap 10) are made from a hardened stainless steel to withstand the repeated wear between these two components. In one embodiment, the remaining components are made from stainless steel.

The foregoing detailed description has been presented for the purposes of illustration and description. It is not intended to be exhaustive or to limit the invention to the particular disclosed embodiments. Numerous variations and configurations will be apparent in light of this disclosure. Thus its intended that the scope of the invention be defined not be this detailed description, but rather by the claims appended hereto.

What is claimed is:

1. A turret assembly configured to be coupleable to the combination of a rifle scope and a rifle, to adjust the position of the rifle scope relative to the rifle, the turret assembly comprising:
   a turret body, the turret body having a first end and a second end, the turret body defining a turret axis;
   a jacking screw coupled to the first end of the turret body, the jacking screw configured for rotational movement relative to the turret body about the turret axis, wherein movement of the jacking screw is configured to adjust the rifle scope in relation to the rifle;
   a turret cap coupled to the second end of the turret body, the turret cap configured for rotational movement relative to the turret body about the turret axis, wherein movement of the turret cap initiates movement of the jacking screw; and
   an indicator coupled to the turret body, the indicator configured to depict information about the position of the turret cap relative to the turret body, wherein the indicator is configured for only translational movement relative to the turret body along the turret axis.

2. The turret assembly of claim 1, further comprising a turret indicator window coupled to the turret body, wherein the indicator is configured for only translational movement relative to the turret indicator window.

3. The turret assembly of claim 2, wherein the turret indicator window includes an opening, wherein at least a portion of the indicator is visible through the opening to depict information about the position of the turret cap relative to the turret body.

4. The turret assembly of claim 2, wherein the turret indicator window is substantially stationary relative to the turret body.

5. The turret assembly of claim 2, wherein the turret indicator window includes a plurality of markings illustrating the number of rotations of the turret cap relative to the turret body.

6. The turret assembly of claim 1, wherein the indicator includes a substantially triangular shaped indicia which is configured to be moveable along the turret axis relative to the turret indicator window.

7. The turret assembly of claim 1, wherein the indicator further comprises a slot configured to receive a mating indicator sleeve set pin in the turret body, which converts the rotational movement of the turret cap into translational movement of the indicator.

8. The turret assembly of claim 1, wherein the indicator includes a substantially rectangular shaped indicia which is configured to be moveable along the turret axis relative to the turret indicator window.

9. The turret assembly of claim 2, wherein the turret indicator window includes a plurality of openings, wherein at least a portion of the indicator is visible through the plurality of openings to each depict information about the position of the turret cap relative to the turret body.

10. The turret assembly of claim 1, wherein the indicator is configured as a substantially cylindrical sleeve.

11. The turret assembly of claim 1, wherein the turret assembly is configured as an elevation turret.

12. The turret assembly of claim 1, wherein the turret assembly is configured as a windage turret.

* * * * *